United States Patent [19]

St. Laurent

[11] 3,967,644

[45] July 6, 1976

[54] COMPRESSOR CONTROL

[75] Inventor: Arthur St. Laurent, Minoa, N.Y.

[73] Assignee: Carrier Corporation, Syracuse, N.Y.

[22] Filed: July 5, 1974

[21] Appl. No.: 485,879

Related U.S. Application Data

[62] Division of Ser. No. 384,774, Aug. 1, 1973, Pat. No. 3,855,813.

[52] U.S. Cl. .......................... 137/512.1; 137/115; 137/119; 137/512.2; 417/299
[51] Int. Cl.² ...................................... F16K 15/02
[58] Field of Search ............ 417/299; 137/115, 116, 137/512.2, 119, 512.1

[56]  References Cited
UNITED STATES PATENTS

| | | | |
|---|---|---|---|
| 2,706,491 | 4/1955 | Kohler | 137/540 |
| 2,960,996 | 11/1960 | Haselton | 137/512.2 X |
| 3,234,961 | 2/1966 | Arnes | 137/517 |
| 3,398,551 | 8/1968 | Yannascoli | 417/299 X |

*Primary Examiner*—Robert G. Nilson
*Attorney, Agent, or Firm*—J. Raymond Curtin; Barry E. Deutsch

[57]  ABSTRACT

A combination equalizer and over-pressure control for use with fluid compressors comprises a passage having a first piston including a relief port therethrough, the piston when in a first position preventing any flow of fluid through a second relief port. A second piston, disposed upstream of the first piston, is movable relative thereto. A first spring provides a force to maintain the second piston in spaced relationship relative to the first piston, the second piston moving into sealing abutment with the first piston to close the first relief port when fluid pressure acting on the second piston exceeds a predetermined value. A second spring provides a force to maintain the first and second pistons in position relative to the second relief port to prevent any fluid flow therethrough. The first and second pistons move jointly at a predetermined over-pressure condition to open the second relief port. Upon the de-energization of the fluid compressor the second piston moves relative to the first piston, whereby the first relief port is opened to relatively quickly equalize pressures across the control.

1 Claim, 3 Drawing Figures

COMPRESSOR CONTROL

This is a division of application Ser. No. 384,774, filed Aug. 1, 1973, now U.S. Pat. No. 3,855,813.

BACKGROUND OF THE INVENTION

This invention relates to fluid compressors and more particularly to a combined pressure equalizer and overpressure control for use with fluid compressors.

Refrigeration units employing fluid compressors typify applications in which there exists a substantial pressure differential across the compressor following shutdown and normally for a number of hours thereafter. If it is desired to restart the compressor during the period of time when the pressure differential exists, the compressor motor must not only have sufficient torque to overcome the inherent inertia of the compressor parts, but it must also overcome the pressure differential in order to restart the compressor. The foregoing necessitates the utilization of either oversized motors or relatively expensive starting accessories.

In U.S. Pat. No. 3,398,551, assigned to the assignee of the instant invention, there is disclosed a compressor control which functions to rapidly equalize the pressure between the suction and discharge sides of the compressor to thereby eliminate the necessity for having starting accessories or the need for using oversized motors. In addition, the control disclosed in the aforecited patent operates to protect the fluid compressor during overpressure conditions.

Although the device disclosed in the aforementioned patent has proven to be extremely satisfactory from a functional standpoint, it has been found that certain of the parts of such control wear more rapidly than desired. In addition, equalization between the discharge and suction side of the compressor is not accomplished quite as rapidly as desired due to internal friction produced by the relative motion of the parts and in particular due to the utilization of an "O" ring for sealing purposes.

SUMMARY OF THE INVENTION

It is therefore an object of the invention to provide a compressor control which permits rapid equalization between the discharge and suction side of the compressor, as well as protects the compressor during overpressure conditions.

It is a further object of the invention to reduce movement of parts of the control to thereby decrease wear thereof.

It is a further object of this invention to eliminate the need for "O" rings or similar sealing devices to thereby eliminate internal friction to increase the rate at which equalization occurs.

These and other objects of the present invention are obtained by providing a control device having a passage adapted to conduct pressure fluid. A first piston-like manner includes a relief port therethrough, the member when in a first position preventing any flow of fluid through a second relief port. A second piston-like member is disposed upstream of the first piston-like member for relative movement therebetween. First force supplying means operates to maintain the second member in spaced relationship relative to the first member, the second piston-like member moving into sealing abutment with the first member to close the first relief port when fluid pressure acting on the second member exceeds a predetermined value. Second force supplying means operates to maintain the first and second members in position relative to the second relief port to prevent any fluid flow therethrough, the first and second piston-like members moving jointly at a predetermined overpressure condition to open the second relief port. The first force supplying means additionally functions to move the second member relative to the first member when the fluid compressor becomes inoperable thereby opening the first relief port. The second piston-like member includes abutment means to maintain the passage means of the control device in an open state when the first relief port is open to relatively quickly equalize pressures across the control.

DESCRIPTION OF THE PREFERRED EMBODIMENT

Figure 1:
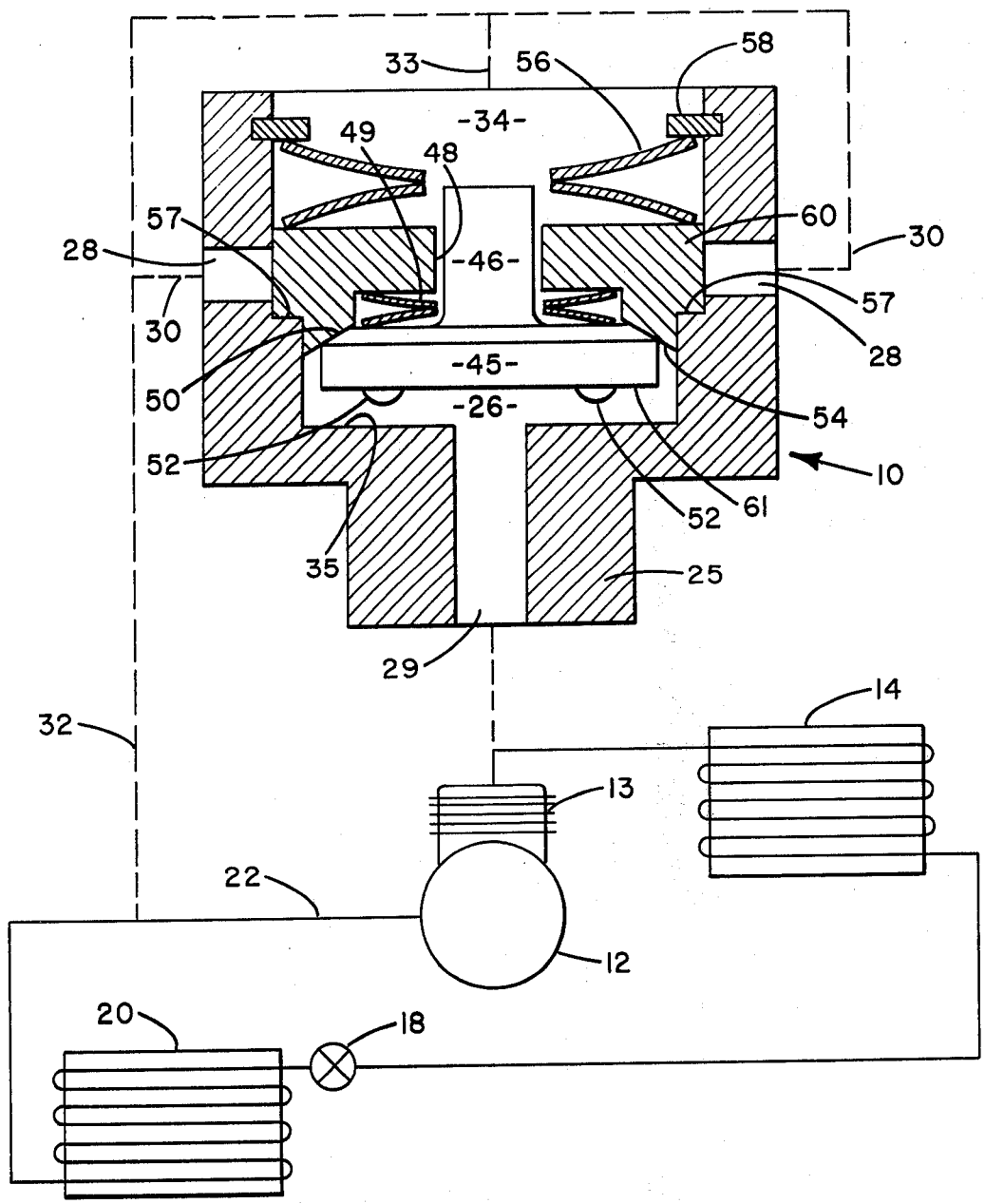
FIG. 1 is a schematic sectional view showing the combination pressure equalizer and overpressure control of the present invention as used with a fluid compressor.

Referring to FIG. 1 of the drawings, there is shown a pressure control 10 of the present invention as used with a fluid compressor 12. As will be more apparent hereinafter, pressure control 10 equalizes pressures across compressor 12 following shutdown of the compressor and protects the compressor against excessive internal pressures. In referring to the various Figures of the drawing, like numerals shall refer to like parts.

In the exemplary showing of the drawing, fluid compressor 12 forms part of a closed fluid pressure unit, more particularly a refrigeration unit having condenser 14, expansion device 18 and evaporator 20. In this type of unit, it is understood that the relatively high pressure vaporous refrigerant discharged by compressor 12 is condensed in condenser 14, the liquid refrigerant leaving condenser 14 being expanded by device 18 and thereafter flowing through evaporator 20 where the refrigerant is vaporized. Gaseous refrigerant from evaporator 20 returns through conduit 22 to compressor 12.

On shutdown of compressor 12, a substantial pressure differential exists across the compressor. Although a part of the pressure differential across the compressor is relatively quickly dissipated, the pressure differential remains relatively high for a comparatively extensive period of time. Where compressor motor 13 is a single phase motor, a start accessory must be added to enable motor 13 to overcome the pressure loading on compressor 12 if it is desired to restart the compressor when a relatively high pressure differential exists. Where motor 13 is a three phase motor, it is necessary to provide a motor having sufficient starting torque to enable the compressor to be restarted when a relatively high pressure differential exists. The cost advantage in eliminating starting accessorries and reducing motor size are evident, and pressure control 10 which effectively neutralizes pressure loading on a compressor in a relatively short time following shutdown of the compressor eliminates the need for motor starting accessories and/or oversized motors.

Pressure control 10 has an outer shell 25 forming a generally cylindrical valve and piston chamber 26. A first end 29 of chamber 26 communicates with the outlet or discharge side of compressor 12. The other end 34 of chamber 26 communicates via conduit 32 and 33 with the inlet or suction side of the compressor. Additionally, conduits 30 and 32 communicate relief ports 28 which are provided in the wall of the valve, with the suction side of the compressor.

A first piston-like member 45 is slidably arranged in chamber 26. Spring 49, disposed between first piston-like member 45 and a second piston-like member 60, urges piston 45 toward end wall 35 of chamber 26.

Piston-like member 45 has a stem-like projection 46. Projection 46 is slidably journaled in coaxial bearing opening 48 provided in second piston-like member 60. Piston-like members 45 and 60 are beveled respectively on opposed surfaces 50 and 54 to form a leak-tight connection when the piston-like members are brought into intimate contact as will be more apparent hereinafter.

Figure 3:
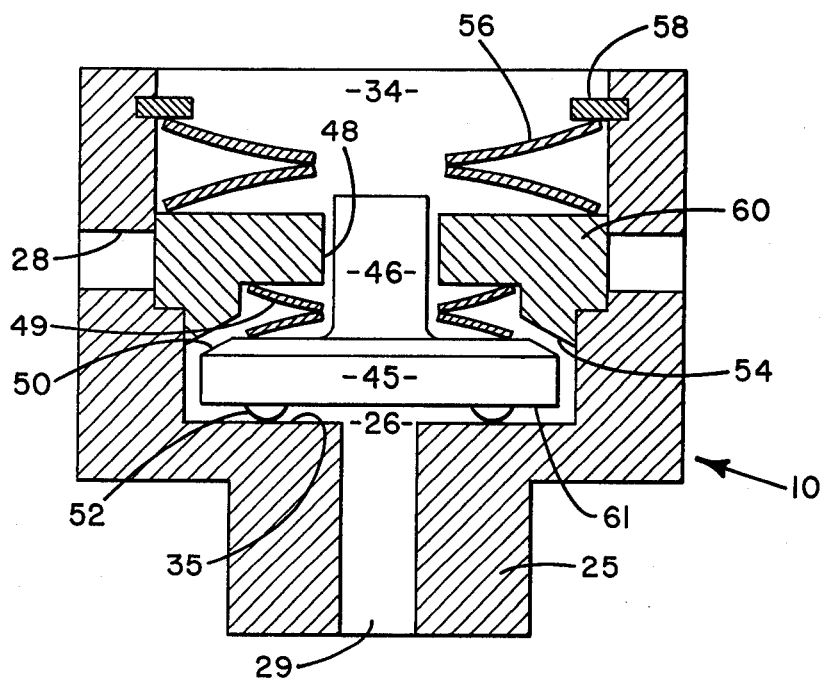
FIG. 3 is a schematic sectional view showing the control of FIG. 1 following shutdown of the compressor.

Piston-like member 45 includes abutment members 52 projecting from surface 61 thereof. Abutment members contact wall 35 as is illustrated in FIG. 3 upon the compressor being rendered inoperable.

A second spring 56 urges second piston-like member 60 towards wall 35 of chamber 26. Shoulders 57 formed on the inner wall of chamber 26 limit the movement of second piston-like member 60 towards wall 35. Stop 58 is provided to maintain spring 56 in its desired location. Preferably, springs 49 and 56 are formed of Belleville washers.

With compressor 12 shutdown, and assuming the pressures between the compressor inlet and outlet to be substantially equal, spring 49 holds first piston-like member 45 against wall 35 of control chamber 26. Inasmuch as member 45 includes abutment members 52, face 61 of member 45 is maintained in spaced relation relative to wall 35 to thereby maintain communication between inlet 29 and outlet 34 of the control. This position is illustrated in FIG. 3 of the drawings. As is evident from FIG. 3, relief port 48 is opened to thereby permit flow from the high pressure side of the control to the low pressure side thereof.

When the compressor is started, the difference in pressure between the inlet and outlet thereof rises. At a predetermined pressure differential, pressure acting on piston-like member 45 overcomes the force supplied by spring member 49 to move piston 45 away from wall 35 of chamber 26 towards second piston-like member 60. Second piston-like member 60 is maintained stationary due to the force supplied by second spring member 56. The opposed beveled faces of the piston-like members engage, thereby closing off any flow through opening 48 of second piston-like member 60. Relief ports 28 are closed by second piston-like member 60. The position of the components of control 10 during normal operation is illustrated in FIG. 1.

Figure 2:
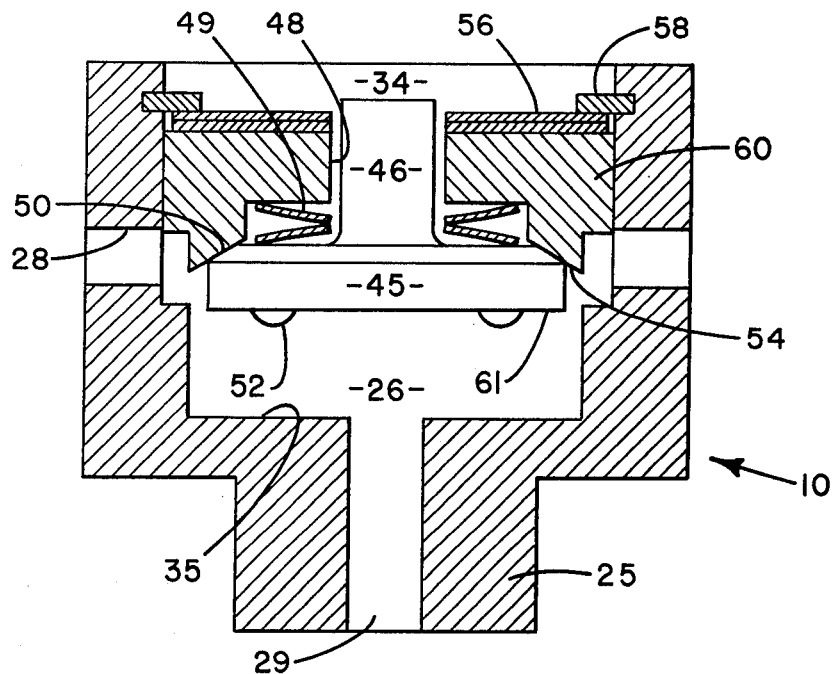
FIG. 2 is a schematic sectional view of the control of FIG. 1 showing the control during occurrence of a compressor overpressure condition.

With relief port 48 closed, a rise in pressure above the normal compressor operating pressure is reflected in control 10 and at a predetermined overpressure, the force acting on members 45 and 60 overcomes the force supplied by second spring member 56 to move the members jointly towards stop 58. This directly connects the compressor discharge and suction through relief ports 28. The position of the elements of the control when an overpressure condition exists is illustrated in FIG. 2 of the drawings. Spring 56 urges piston-like members 45 and 60 to their normal operating position illustrated in FIG. 1 when the over-pressure condition has been eliminated.

When compressor 12 is shut down, the existing pressure differential across compressor 12 undergoes an initial decrease as pressures are dissipated due to internal leakage within the various components of the refrigeration unit. Following this initial decrease in pressure differential across the compressor, the rate of decrease of the pressure differential falls quite substantially. First spring-like member 49 urges piston-like member 45 towards wall 35 of chamber 26; however face 61 of member 45 is maintained in spaced relation relative to wall 35 by the projecting abutment members 52. The continued communication between the high pressure and low pressure sides of the compressor, as provided through relief port 48 results in a continuing decrease in the pressure differential across the compressor.

The present pressure control operates to rapidly equalize the pressure differential across a compressor and also safeguards the compressor from excessive internal pressures. The control of the present invention employs a limited number of parts having limited movement to thereby increase the operating life of the control. In addition, the present control eliminates the need for an "O" ring or other internal seal, as exemplified by the prior art of the heretofore cited United States patent; the elimination of such "O" ring reduces the internal friction of the moving parts to thereby further increase the rate at which the pressure differential is equalized.

While a preferred embodiment of the present invention has been described and illustrated, it will be understood that the invention is not limited thereto, but may be otherwise embodied with the scope of the following claims.

I claim:

1. A combination equalizer and over pressure control for use with fluid compressors comprising:
   a. a housing defining a chamber with a flange-like wall at one end thereof;
   b. means forming a passage adapted to conduct pressure fluid, and including a first piston-like member having a first relief port therethrough, and when in a first position preventing any flow of fluid through a second relief port;
   c. means for closing said relief port including a second piston-like member disposed upstream of said first piston-like member, said first and second members being movable relative to one another;
   d. control means including first force supplying means disposed between said first and second piston-like members to bias said second member away from said first member, said second member moving into sealing abutment with said first member to close said first relief port when fluid pressure acting on said second member exceeds a predetermined value, and second means providing a force to maintain said first and second members in position relative to said second relief port to prevent any fluid flow therethrough, said first and second members moving jointly at a predetermined over pressure condition to open said second relief port; and
   e. said first force supplying means moving said second member relative to said first member to bias said second piston-like member toward said wall of said housing when the fluid compressor becomes inoperable thereby opening said first relief port, said second member including abutment means contacting said wall to maintain said passage means in an open state when said first relief port is opened to relatively quickly equalize pressure across said control.

* * * * *